United States Patent
Nishimaki et al.

[11] 3,895,146
[45] July 15, 1975

[54] METHOD AND STRUCTURE FOR THERMALLY INSULATING LOW TEMPERATURE LIQUID STORAGE TANKS

[75] Inventors: Ko Nishimaki; Tomomichi Kurihara, both of Osaka, Japan

[73] Assignee: Hitachi Shipbuilding & Engineering Co. Ltd., Osaka, Japan

[22] Filed: July 6, 1972

[21] Appl. No.: 269,488

Related U.S. Application Data

[63] Continuation-in-part of Ser. No. 86,529, Nov. 3, 1970, abandoned.

[52] U.S. Cl. .............. 428/56; 428/119; 220/9 LG; 220/9 F; 220/63 R
[51] Int. Cl. ........ B32b 5/20; B32b 3/26; B32b 7/02
[58] Field of Search .......... 161/161, 159, 160, 166, 161/190, 252, 139, 122, 124; 220/9 F, 63 R, 9 LG, 15; 62/45, 69; 52/309

[56] References Cited
UNITED STATES PATENTS

| | | | |
|---|---|---|---|
| 2,376,653 | 5/1945 | Boyer | 161/161 |
| 3,120,319 | 2/1964 | Buddrus | 220/9 F |
| 3,199,261 | 8/1965 | Soddy | 52/309 |
| 3,367,492 | 2/1968 | Pratt | 161/190 |
| 3,429,085 | 2/1969 | Stillman | 220/9 F |
| 3,616,113 | 10/1971 | Sawyer | 161/161 |
| 3,802,948 | 4/1974 | Noma | 220/9 LG |

*Primary Examiner*—George F. Lesmes
*Assistant Examiner*—Ellis P. Robinson
*Attorney, Agent, or Firm*—Farley, Forster and Farley

[57] ABSTRACT

This invention prevents a high density region from being formed in that portion of a thermal insulation structure which is in contact with the wall of a low temperature liquid storage tank. To this end, the invention provides a method comprising bonding a layer of low temperature resistant soft plastic foam material to the outer surface of the tank wall and then forming a hard plastic foam layer on the outer side of said soft plastic foam, thereby increasing the thermal shock resistance of the thermal insulation structure to prevent the cracking thereof as well as providing a more uniform density of the thermal insulation structure. The hard plastic foam layer is preferably formed by a foaming-in-place operation carried out in a space defined by spacers secured to the tank and by a sheathing panel secured to the spacers.

7 Claims, 6 Drawing Figures

3,895,146

METHOD AND STRUCTURE FOR THERMALLY INSULATING LOW TEMPERATURE LIQUID STORAGE TANKS

RELATED APPLICATION

This application is a continuation-in-part of application Ser. No. 86,529, filed Nov. 3, 1970, now abandoned.

BACKGROUND OF THE INVENTION

A process for directly forming a self-bonding hard plastic foam stock has been considered unsuitable for the thermal insulation of tanks for storing low temperature liquids, particularly ultra low temperature liquids such as liquified methane, liquid oxygen and liquid nitrogen. This is because the direct forming of a hard plastic foam stock on a metallic tank results in a high density region being formed in the portion of the foamed material which is in contact with the tank wall, which high density region is so low in its resistance to thermal shocks as to be rendered brittle under large changes in temperature, and is incapable of withstanding relative strains due to the difference in the coefficients of linear expansion of the high density plastic and the metal of the tank, so that cracking or rupturing of the plastic occurs.

Since tanks for storing low temperature liquids inevitably suffer large changes in temperature because of the charging and discharging of such low temperature liquids, it is necessary that the thermal insulation structure should have sufficiently high resistance to thermal shocks to withstand the temperature changes.

Although the maximum thermal shock resistance of hard polyurethane foam usually used for thermally insulating this kind of tank is about 250°C, the forming of this hard polyurethane foam by a foaming-in-place operation results in the portion of the foam in contact with the tank wall being greatly increased in density, thereby creating a skin portion whose maximum thermal shock resistance is decreased to the point that it cannot withstand the temperature change of about 200°C which occurs when a low temperature liquid such as liquified methane is used.

SUMMARY OF THE INVENTION

The present invention overcomes the problems described above, and has for its principal object the provision of a thermal insulation structure which can be obtained by the foaming-in-place of a self-bonding hard plastic foam and yet can withstand the large temperature change of about 200°C which occurs in the storing of ultra low temperature liquids such as liquified methane, without cracking and rupturing of the thermal insulation layer.

Thus, the present invention relates to a thermal insulation structure for low temperature liquid storage tanks, comprising a layer of soft insulation, such as synthetic resin foam, provided on the surface of a low temperature liquid storing tank and a hard synthetic resin foam layer formed on the outer side of the first-mentioned layer.

According to the arrangement described above, the soft synthetic resin foam layer having a low density, is in contact with the wall surface of a tank where large temperature changes take place because of charging and discharging low temperature liquids, whereas the hard synthetic resin foam layer is in contact with the soft synthetic resin foam whose range of temperature changes is very small relative to that of the tank wall surface. As a result, even in cases where a skin portion having a high density exists in the hard synthetic resin foam layer, there is no possibility of cracking or rupturing of the hard synthetic resin foam taking place under the action of thermal stresses as before, and the maximum thermal shock resistance of the entire thermal insulation structure is greatly improved.

Applicant's experiments have confirmed that the improved insulation structure satisfactorily withstands quick cooling caused by liquid nitrogen. In this improved insulation structure, since the hard synthetic resin foam is in contact with an elastic layer such as the soft synthetic resin foam, which is higher in temperature level and lower in thermal conductivity than the tank, it is possible to suppress the formation of a skin portion of high density and attain the homogenization of the hard synthetic resin foam even in the case where the hard synthetic resin foam is formed and bonded to the soft synthetic resin foam by a foaming-in-place operation in a space defined by a panel secured to spacer members attached to the surface of the tank.

DESCRIPTION OF THE PREFERRED EMBODIMENTS

Although the embodiments to be described herein relate to an application of the present invention to a low temperature liquified gas storage tank in a liquified gas cargo ship, the invention can also be applied to a low temperature liquid storage tank used elsewhere.

Figure 1:
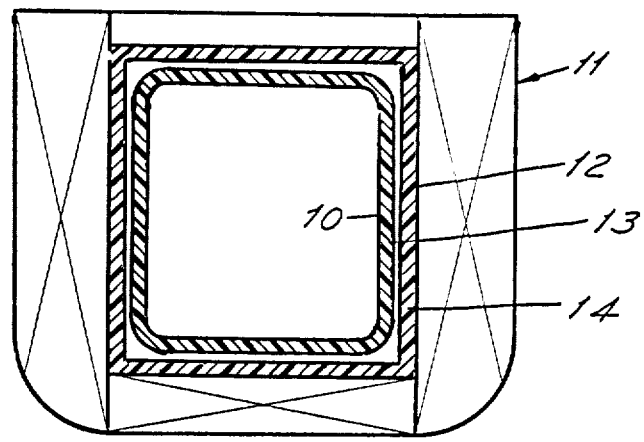
FIG. 1 is a schematic sectional view showing a liquified gas tank placed in the hull of a ship.

In FIG. 1, the numeral 10 denotes a low temperature liquid storage tank installed in the hold of a cargo ship, the hull thereof being shown at 11. The tank is enclosed by a shell 12 within the hull with a fixed clearance therebetween to allow for the thermal expansion and contraction of the tank. The tank 10 is formed of metal plate and the outer peripheral side thereof is provided with a thermal insulation structure 13 to be described later. If necessary, besides this thermal insulation structure 13, a secondary thermal insulation structure 14 may be provided on the inner peripheral side of the shell 12. When two such thermal insulation structures are provided, there is generally a clearance between them.

Figure 2:
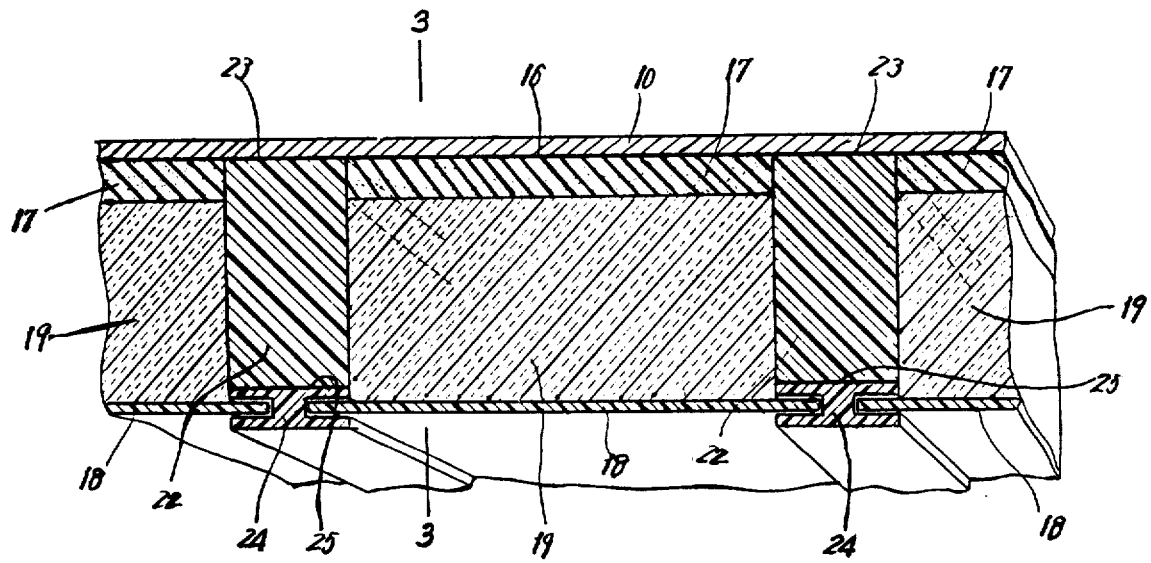
FIG. 2 is an enlarged sectional perspective view showing a portion of the wall of the tank of FIG. 1 having a thermal insulation structure applied thereto according to the present invention.
Figure 3:
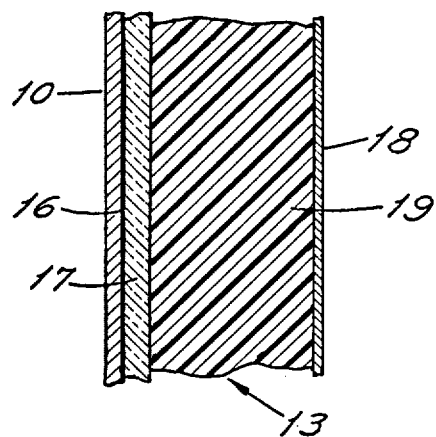
FIG. 3 is a sectional detail taken as indicated by the line 3—3 of FIG. 2.

The present invention relates to the above-mentioned thermal structure 13. As shown in FIGS. 2 and 3, elongated spacers 22 are first bonded to the outer surface of the wall of the tank 10 at regular intervals by using a low temperature resisting adhesive 23, the spacers being in the form, for example, of members of rectangular cross section composed of rigid polyurethane foam, rigid polystyrene foam, or the like.

After the spacers are thus bonded to the tank wall 10, a soft layer 17, formed of soft polyurethane foam, soft polystyrene foam, fiber, soft paper or the like, 5 to 15 mm in thickness, is bonded to the outer surface of the wall of the tank 10 between adjacent spacers 22 by using a low temperature resistant adhesive 16.

Sheathing panels 18, such as sheets of rigid plastic or plywood, are then attached to the spacers, either by securing the sheathing panels 18 directly to the outer surfaces of the spacers 22 by an adhesive or by suitable fasteners; or, by employing panel joints 24 of H-shaped cross section attached to the outer surface of each of the spacers 22 by a low temperature resisting adhesive 25, or by suitable fasteners. In the construction illustrated in FIG. 2, the sheathing panels 18 are fitted in the grooves of the joints 24 and are slid into position, thereby defining a rectangular columnar space, or foaming frame surrounded by adjacent spacers 22, the soft layer 17, and the panels 18.

A required amount of foamable stock liquid such as rigid polyurethane foam, rigid polystyrene foam or the like is then fed into this foaming frame where it is allowed to foam, filling the spacer with a hard layer 19 of rigid synthetic resin foam.

Figure 4:
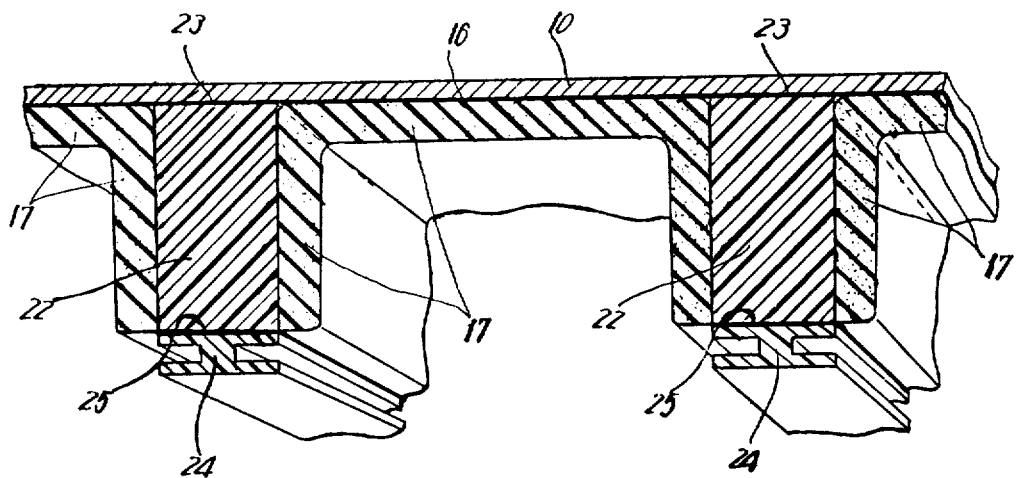
FIG. 4 is a sectional perspective view similar to FIG. 2, but showing an alternate form of thermal insulation structure.

As shown in FIG. 4, the soft layer 17 may be formed in such a manner as to cover the opposed lateral surfaces of adjacent spacers 22, and by so doing it is possible to prevent a hard skin from forming on the portions of the hard foam layer 19 which would otherwise contact the lateral surfaces of the spacers 22.

Figure 5:
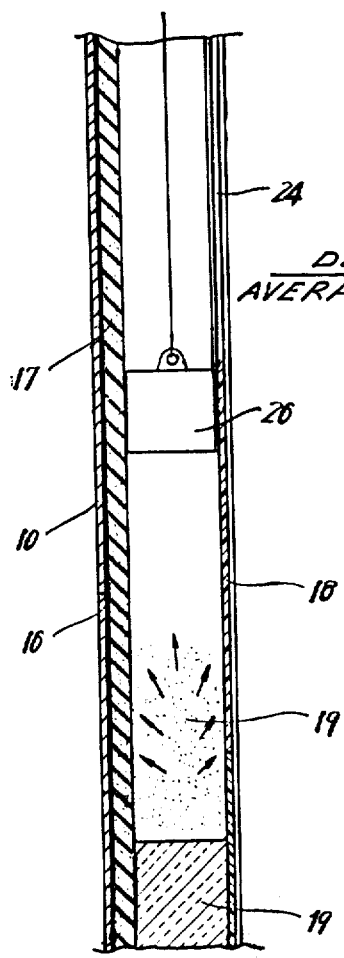
FIG. 5 is a sectional view similar to FIG. 3 illustrating the forming of a portion of the thermal insulation structure; and, FIG. 6 is a graph showing the relations between the thickness and the density of the thermal insulation structure.

The foaming-in-place operation for forming the hard layer 19 and the operation of mounting the sheathing panels 18 are carried out in successive regions of constant volume between adjacent spacers. In the case where these operations are being carried out on a vertical wall of the tank 10, as shown in FIG. 5, the upper limit of a foaming region may be controlled by a weighted lid 26 suspended from above. As the weighted lid is moved upwardly in increments, sheathing panels 18, each having the same area, may be mounted successively one upon another to extend upwardly. The edge-to-edge connection between sheathing panels 18 may be effected in any desired manner, e.g. by simply abutting the panels edge-to-edge or by using a joint such as the joint 24 of H-shaped cross section. If a transparent rigid plastic sheet is used as a sheathing panel 18, it is possible to observe the foaming conditions taking place as the hard layer 19 is formed. In any event it is considered preferable and more efficient to divide the foaming region into sections of unit volume so that the density of the foam layer 19 can be more easily controlled and made uniform.

The material and thickness of the soft layer 17 and the hard synthetic resin layer 19 may be suitably selected according to the temperature of a liquid to be stored, the size of the tank and the period of time for which the liquid is stored in the tank, but in the case of applying the invention to a tank for storing ultra low temperature liquids at about −200°C, desirable results have been obtained when the thickness of the soft layer 17 is of the order of 5mm–15mm and the thickness of the hard synthetic resin layer 19 is generally of the order of 150mm–250mm.

The invention will be further described by reference to an illustrative test example.

A tank having overall dimensions of 2000mm in length, 300mm in width and 1000mm in depth was constructed with a wall of 9 percent nickel steel. Spacers 22 of hard polyurethane foam 50mm × 50mm in cross-sectional dimensions, were attached to the tank exterior surface at the ends and middle of the lengthwise dimension, at intervals of about 900mm, and a soft layer 17 having a density of 0.02 and a thickness of 15mm was bonded to the exterior surface of the tank 10 and also to the lateral surfaces of the spacers 22, as shown in FIG. 4, by means of a foamable resin adhesive (commercially available). A soft polyurethane foam produced by Nihon Soflan Chemical & Engineering Co., Ltd., under the trade name "SOFLANATE" No. 501, was used for the layer 17. Sheathing panels 18 of hard plastic sheet, 1mm thick, were then adhesively bonded to the outer surface of the spacers 22 to form a foaming frame, and the stock solution for the second layer 19 was poured into the foaming frame and allowed to foam. A hard (rigid) polyurethane foam stock solution produced by Nihon Soflan Chemical & Engineering Co., Ltd., under the trade name "PAC" 35050/1348—27M, was used to form the layer 19, to a thickness of 50mm, the temperature of the stock solution being 27°C and atmospheric temperature 28°C.

After the above heat insulation construction was completed, liquid nitrogen at −192°C was poured into the tank, and various regions of the heat insulation layer showed a temperature of −110°C. Thus the object of primary heat insulation was achieved.

After the heat insulation test was completed, the heat insulation layer was disassembled and examined. It was found that the density of the hard foam layer 19 was 0.04, the density being uniform throughout. The soft layer 17 had been compressed from 15mm to 5mm by the pressure exerted during the foaming of the hard layer 19.

Figure 6:
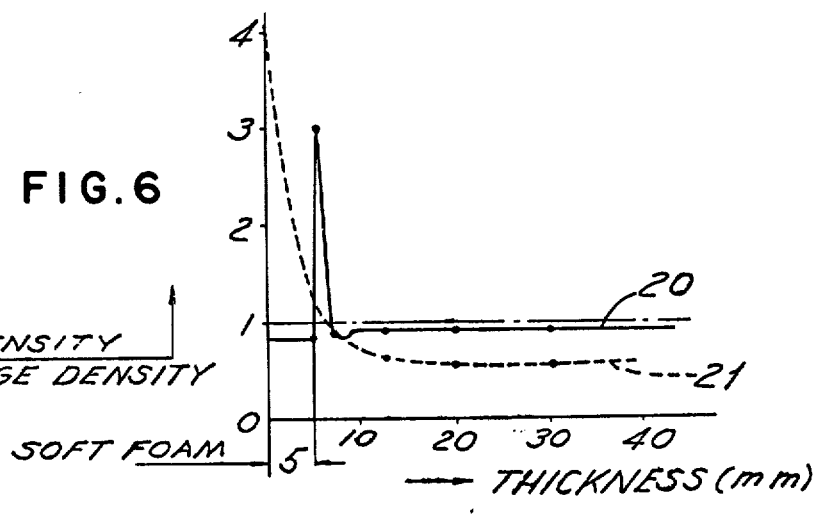

Test results of applying the hard outer layer 19 by a foaming-in-place operation are shown in the solid line curve 20 of FIG. 6 which plots the ratio of density to average density against the thickness of the insulation structure. The broken line curve 21 in this figure illustrates the conventional method of directly applying the hard foam to the surface of the tank. As is apparent from this figure, although the present invention cannot completely eliminate the skin portion of high density in the hard outer layer 19, it is possible to obtain a distinctly more homogeneous structure as compared with the conventional method represented by the line 21.

What is claimed is:

1. A thermal insulation structure for the surface of a low temperature liquid storage tank comprising:
preformed spacer members of rigid polyurethane or polystyrene foam material secured to said surface at fixed intervals;
a first layer of soft, low temperature resistant material bonded to said surface between adjacent spacer members, said material being selected from the group consisting of polyurethane or polystyrene foam;
sheathing panels carried by said spacer members in outwardly spaced relation to said first layer; and, a second layer of hard, high density polyurethane or polystyrene foam material filling the volumes defined by said first layer, spacer members and sheathing panels.

2. A thermal insulation structure according to claim 1 wherein at least some of said sheathing panels are formed of rigid plastic sheet.

3. A thermal insulation structure according to claim 2 wherein said rigid plastic sheet is transparent.

4. A thermal insulation structure according to claim 1 wherein the thickness of said first layer does not exceed one-tenth the thickness of said second layer.

5. A thermal insulation structure according to claim 1 wherein the spacer members are each provided with a joint having a slotted groove for receiving the edge portion of a sheathing panel.

6. A thermal insulation structure according to claim 1 wherein the first layer is applied to the surfaces of the spacer members within the sheathing panel.

7. A thermal insulation structure for the surface of a low temperature liquid storage tank comprising:
performed spacer members of rigid polyurethane or polystyrene foam material secured to said surface at fixed intervals;
a first layer of soft, low temperature resistant, low density synthetic foam bonded to said surface between adjacent spacer members;
sheathing panels carried by said spacer members in outwardly spaced relation to said first layer; and,
a second layer of hard, high density foam material filling the volumes defined by said first layer, spacer members and sheathing panels.

* * * * *